No. 611,350. Patented Sept. 27, 1898.
J. T. BRAYTON.
LENS MEASURE.
(Application filed Jan. 14, 1895.)
(No Model.) 2 Sheets—Sheet 1.
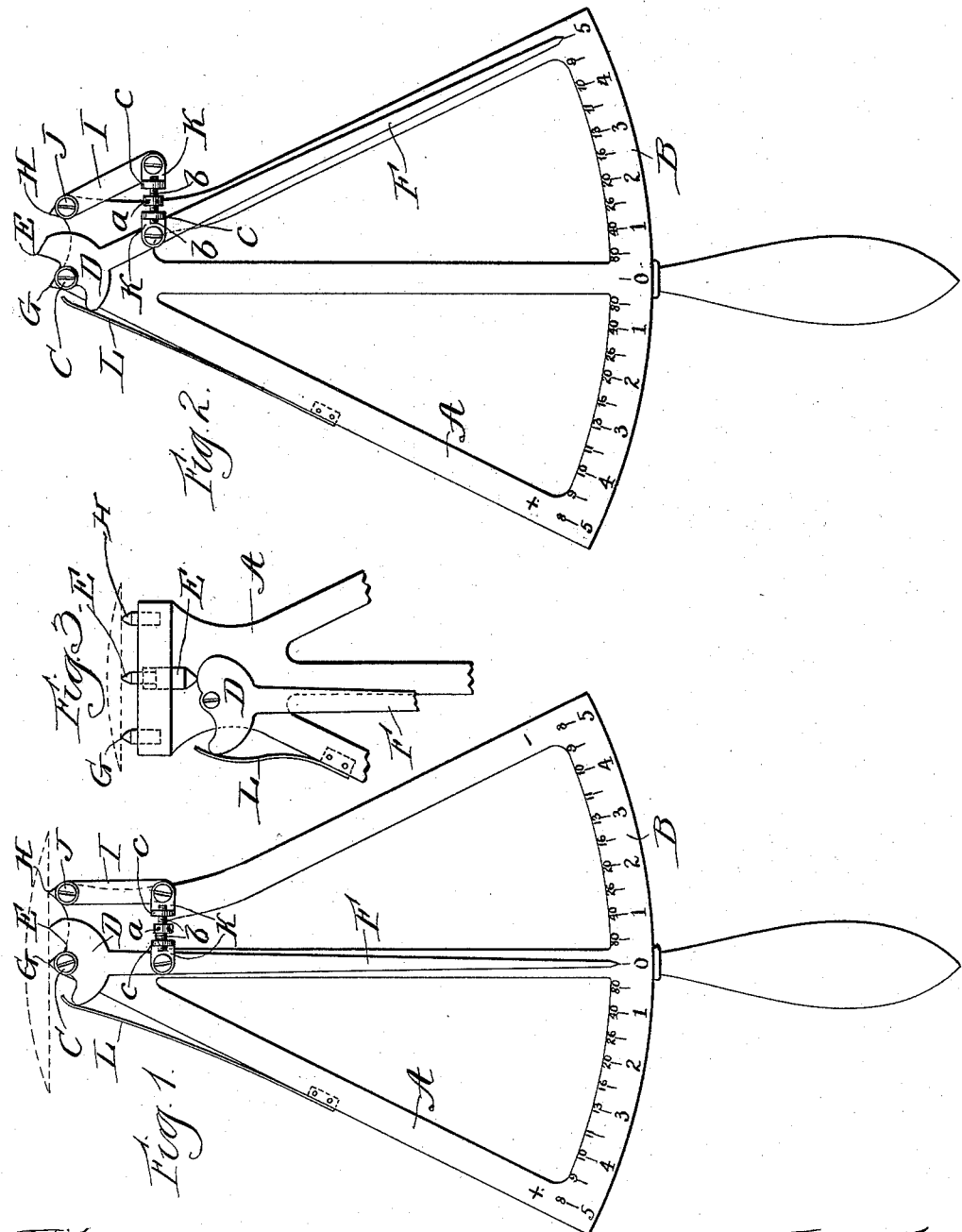
Witnesses
Inventor
James T. Brayton No. 611,350. Patented Sept. 27, 1898.
J. T. BRAYTON.
LENS MEASURE.
(Application filed Jan. 14, 1895.)
(No Model.) 2 Sheets—Sheet 2.
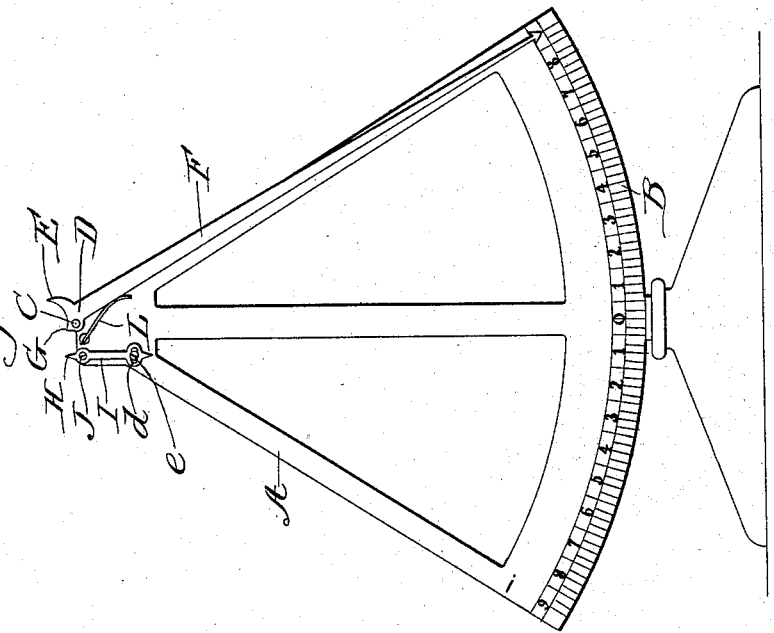
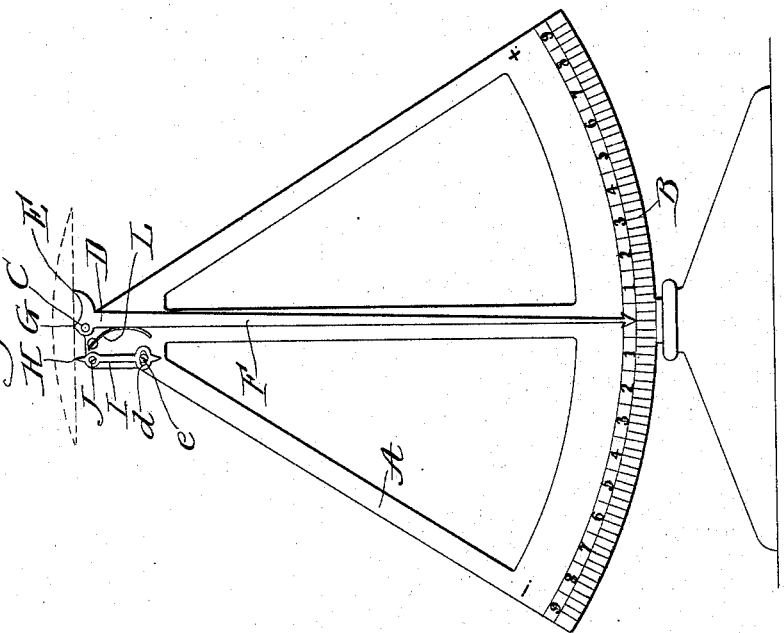

UNITED STATES PATENT OFFICE.

JAMES T. BRAYTON, OF CHICAGO, ILLINOIS, ASSIGNOR TO THE GENEVA OPTICAL COMPANY, OF SAME PLACE.

LENS-MEASURE.

SPECIFICATION forming part of Letters Patent No. 611,350, dated September 27, 1898.

Application filed January 14, 1895. Serial No. 534,869. (No model.)

*To all whom it may concern:*

Be it known that I, JAMES T. BRAYTON, a citizen of the United States, residing at Chicago, in the county of Cook and State of Illinois, have invented certain new and useful Improvements in Lens-Measures, of which the following is a full, clear, and exact description, reference being had to the accompanying drawings, forming a part of this specification.

This invention relates to improvements in that class of measuring instruments designed for measuring the curvature of surfaces, but more particularly relates to improvements in curve-measuring instruments for determining the focal length of lenses, which class is exemplified by Letters Patent of the United States No. 447,276, granted me February 24, 1891.

The objects of this invention are simplicity of construction, durability of the parts, accuracy of measurements, and direct instead of indirect gearing between the movable point and the indicator or index-finger by which the measurement is indicated upon a scale.

These objects and such others as may hereinafter appear are attained by the devices illustrated in the accompanying drawings, in which—

Figure 1 represents a front elevation of a lens-measure embodying my invention with the parts in the position to which they will be brought by a plane surface in contact with the measuring-points thereof. Fig. 2 represents a similar view showing the parts in their normal unrestrained position. Fig. 3 represents a modification of my invention; and Figs. 4 and 5 views similar to Figs. 1 and 2, showing another modification of my invention.

Similar letters of reference indicate the same parts in the several figures of the drawings.

Before entering into the details of construction of my lens-measure it may be well to explain the general uses and purposes thereof, which are the same as those of my former patent before referred to as exemplifying the art to which the present invention belongs. In both my former invention and the present invention there are three points in a line, one of which is movable with relation to the other two, this movable point being normally actuated in one direction by a coiled spring, and is geared, coupled, or connected to an index-finger, which indicates upon a scale the curvature of a surface or the focal length of the lens brought in contact with the three points.

When a plane or flat surface is brought to bear upon the three contact-points, the index-finger is moved to zero on the scale. When a concaved surface is brought to bear upon the three points, the index-finger will be moved, either by such surface or under the influence of a spring and control of such surface, to one side of zero, and when a convex surface is brought to bear on the three points the index-finger will be moved to the opposite side of zero. It is common to mark the side of the scale upon which the concave measurements are indicated as "Minus" and the side upon which the convex measurements are indicated as "Plus."

Referring now to the drawings, and more particularly to Figs. 1 and 2 thereof, A indicates a frame of any suitable character, but preferably stamped out of sheet metal, so as to have side and central arms connected by a curved or segmental plate B, upon which is formed or to which is applied or attached a suitable scale graduated to indicate the proper variations of curvature, as will be described farther on. To the upper end of this frame is pivoted at C a bell-crank lever D, one arm of which terminates in the contact-point E, while the other arm terminates in an index-finger F, which extends down to the scale B, upon which it indicates the movements of the other end E of the lever. At each side of the point E are the points G and H, equidistant therefrom, the point G being also formed upon the bell-crank lever in a radial line coincident with the arm F. The point H is formed or carried upon a lever I, pivoted at J to the frame A, the lower end of said lever I being connected by a link K with the arm F of the bell-crank lever D.

The pivots of the bell-crank lever D and the lever I are in the same horizontal plane, while the contact-points E, G, and H are in the same vertical plane—that is, in a line— and are also in the same horizontal plane when a flat surface is brought to bear upon the three points, as indicated by the dotted lines in Fig. 1, at which time the index-finger F indicates zero on the scale.

As the middle movable point E swings upon the arc of a circle, the link K is provided in order to cause the points G and H to move laterally to the same extent that the central point moves laterally, so as to maintain a substantially uniform distance between the three points at all times. As will appear farther on, however, it will be seen that I do not desire to limit my invention to this construction. I have also shown the link K adjustable as to length for the purpose only of affording an easy and quick means for correcting inaccuracies in the construction of the instrument. This means consists of a thumb-piece $a$, having oppositely-extending and oppositely-pitched screws $b$—that is, one having a right-hand thread and the other a left-hand thread which work, respectively, through threaded ears $c$ upon the ends of the link, so that when the thumb-piece $a$ is turned in one or the other direction the ends of the link, and consequently the end of the lever I and the arm F of the bell-crank lever, to which such ends of the link are respectively pivoted, are caused to approach and recede from each other, and thereby cause the points G and H to correspondingly approach and recede from each other. In this way the exact desired relative location of these points may be obtained, notwithstanding slight inaccuracies in the location of their pivots or of the holes in the arms through which the pivots pass; but when once the points are properly adjusted the thumb-piece, with its accompanying screws, has no other office to perform except as part of the link or for such future use as may be necessary to correct such inaccuracies as may arise out of the use of the instrument.

When unrestrained, the index-finger will normally lie in the position shown in Fig. 2 at the extreme right-hand side of the scale, being moved to such position by the spring L, attached to the frame A and bearing against the bell-crank lever D. Obviously the form, kind, or location of the spring for performing this office is immaterial so long as the desired result is attained. If in this position of the parts a plane surface is brought in contact with the three points E, G, and H, as indicated by the dotted lines in Fig. 1, the index-finger F will be moved to zero on the scale. If, however, a concave surface be brought in contact with these three points, the index-finger will be moved only part way to the zero-mark and will indicate upon the scale the degree of curvature of the concave surface, or if such surface be that of a lens it will indicate the focal length of the lens. On the other hand, if a convex surface be brought in contact with the three points the index-finger will move past and beyond the zero-mark and indicate upon the plus scale at the left-hand side of such mark the degree of curvature of such surface or the focal length of the convex lens. Obviously in making concave measurements the movable middle point remains above a line drawn across the two fixed points, while in measuring convex surfaces the middle point moves to a position below a line drawn across the fixed points.

In Fig. 3 I have shown a modification in which the middle movable point instead of being carried by or forming part of the bell-crank lever is formed of a separate piece E', which is guided in the frame A and abuts against the upper arm of the bell-crank lever D. As this point moves vertically and always in a straight line, the points G and H, used in connection therewith, may be fixed in every sense of the word, and the link K is dispensed with, because of no utility in such a construction, the three points remaining at all times in a fixed relative location, except as to the vertical movements of the movable middle point. The index-finger in this case is the same as that in the first-described construction—that is to say, the arm F of the bell-crank lever carries or constitutes the index-finger.

The modification shown in Figs. 4 and 5 is the same in principle as the constructions previously described, the principal difference being that the movable point in this construction is one of the outside points, and the bell-crank lever is not shown as connected with the lever carrying the other fixed point by a link, although in practice it of course may be. From this difference results the fact that the index-finger normally lies in a position at the extreme right of the scale, which with this construction is the plus side of the scale, whereas in the first-described construction it is the minus side. The bell-crank lever is still employed, but the movable point E thereof is at the outside. The other point G, carried by the lever, is in this arrangement the middle point, while the other outer point H, as in the first-described construction, is formed upon a separate lever I, which is pivoted at J to the frame A, but at its lower end is provided with a curved slot $d$, through which works a set-screw $e$, which permits the initial adjustment of the point H, but holds the same in any adjusted position.

From the foregoing it will be readily understood that the broad idea of my invention contemplates the use, in connection with three or more points in a line, one of which is movable with relation to the others, of a lever of any kind, arrangement, or disposition, which is operated by the movable point and which constitutes or carries the index-finger for indicating upon a scale the measurements made by the points, and consequently I do not desire to limit myself to any particular construction or mode of operation. It is also obvious that the adjustability of the otherwise relatively fixed points G and H is immaterial to the broad idea of my invention, the fundamental principle of which is not affected by either the presence or absence of such adjustability, it being contemplated under any of the constructions herein shown or any other construction within the purview of my invention that the points G and H may be absolutely fixed, as illustrated in Fig. 3, with relation to the movable point, regardless to whether the movable point forms part of, is carried by, or abuts against the indicating-lever, for any irregularities which would occur in the absence of such adjustability of these points can be cured by the use of an arbitrary scale, as will readily suggest itself to one skilled in the art to which my invention appertains.

Having described my invention, what I claim as new therein, and desire to secure by Letters Patent, is—

1. In a lens-measure, the combination with a plurality of points arranged in a line, one of which is vertically movable with relation to the other points, of a lever carrying the middle and one of the other points and terminating in an index-finger moving over a dial or scale, said lever having an upwardly and outwardly projected portion, a spring secured to the frame and acting against the outer surface of said projected portion of the lever, and a lever carrying a single point, substantially as shown and described.

2. In a lens-measure, the combination with the supporting-frame of a plurality of points arranged in a line, one of said points being vertically movable with relation to the other points, a lever fulcrumed on the frame, and provided at one end with an index-finger moving over a dial or scale, while its opposite end effects the vertical movement of the said movable point, said lever having an upwardly and outwardly projected portion, a spring secured to the frame and acting against said projected portion of the lever, and a lever carrying a single point, substantially as described.

3. In a lens-measure having a plurality of points arranged in a line, the combination with a dial-frame, of a lever fulcrumed thereon and carrying at its upper end two of said points, and provided at its lower end with an index-finger, the fulcrum-point of said lever when in normal or vertical position being in the vertical plane of one of the points carried by it, an adjustable lever carrying a single point, and a spring bearing upon the upper end of the index-lever, substantially as described.

JAMES T. BRAYTON.

Witnesses:
M. E. SHIELDS,
O. R. BARNETT.